(12) United States Patent
Haas et al.

(10) Patent No.: US 6,447,744 B1
(45) Date of Patent: Sep. 10, 2002

(54) PROCESS FOR THE PREPARATION OF HYDROGEN PEROXIDE

(75) Inventors: Thomas Haas, Frankfurt; Jürgen Glenneberg, Offenbach; Rudolf Wagner, Grosskrotzenburg; Matthias Creutz, Rossdorfer; Jörg Sauer, Gelnhausen; Rudolf Vanheertum, Kahl, all of (DE)

(73) Assignee: Degussa-Huls AG, Frankfurt am Main (DE)

( * ) Notice: Subject to any disclaimer, the term of this patent is extended or adjusted under 35 U.S.C. 154(b) by 54 days.

(21) Appl. No.: 09/706,184

(22) Filed: Nov. 6, 2000

(30) Foreign Application Priority Data

Nov. 5, 1999 (DE) .......................... 199 53 185

(51) Int. Cl.$^7$ ............................................ C01B 15/023
(52) U.S. Cl. ........................................................ 423/588
(58) Field of Search ................................ 423/588, 589, 423/590

(56) References Cited

U.S. PATENT DOCUMENTS

| | | | |
|---|---|---|---|
| 3,755,552 A | 8/1973 | Lee et al. | |
| 4,428,922 A | 1/1984 | Hopkins | |
| 5,063,043 A | 11/1991 | Bengtsson | |
| 5,662,878 A | * 9/1997 | Datta et al. | 423/588 |
| 6,126,914 A | * 10/2000 | Ogasawara et al. | 423/588 |

FOREIGN PATENT DOCUMENTS

| | | |
|---|---|---|
| DE | 999 181 | 5/2000 |
| EP | 384 905 | 8/1990 |
| EP | 672 617 | 9/1995 |
| GB | 2 334 028 | 11/1999 |

OTHER PUBLICATIONS

Elvers, Barbara, ed., Ullmann's Encyclopedia of Industrial Chemistry, Errata vols. A1 to A11, (Weinheim, Germany: Verlagsgesellschaft mbH, 1989), pp. 447–457. (no month).

* cited by examiner

Primary Examiner—Wayne A. Langel
(74) Attorney, Agent, or Firm—Pillsbury Winthrop LLP

(57) ABSTRACT

In carrying out the hydrogenation stage of the anthraquinone process for the preparation of hydrogen peroxide in a hydrogenation reactor on a fixed bed catalyst of a particulate catalyst, the service life of the catalyst is increased in that the working solution comprising the reaction carrier and a gas phase comprising hydrogen, are passed through the hydrogenation reactor from the bottom upwards. The empty tube speed of the working solution is 0.05 to 100 m/h, preferably 10 to 50 m/h.

9 Claims, No Drawings

PROCESS FOR THE PREPARATION OF HYDROGEN PEROXIDE

CROSS-REFERENCE TO RELATED APPLICATION

This application is based on German Application DE 199 53 185.4, filed Nov. 5, 1999, which disclosure is incorporated herein by reference.

FIELD OF THE INVENTION

The invention relates to a process for the preparation of hydrogen peroxide by the anthraquinone process, wherein the hydrogenation stage is carried out in a reactor with a fixed bed of particulate catalyst arranged therein.

BACKGROUND OF THE INVENTION

It is known to prepare hydrogen peroxide by the so-called anthraquinone process. This process is based on alternate hydrogenation and oxidation of anthraquinone derivatives, conventionally 2-alkylanthraquinones and 2-alkyltetrahydroanthraquinones, wherein the alkyl group is linear or branched and in general contains 2 to 6 carbon atoms. The anthraquinones mentioned and the anthrahydroquinones obtained in the hydrogenation stage are called, in general terms, reaction carriers in the following. In the anthraquinone process, these reaction carriers are dissolved in an organic solvent system and the solution is designated the working solution. In the hydrogenation stage of the anthraquinone process, the alkylanthraquinones and alkyltetrahydroanthraquinones are converted into the corresponding alkylanthraquinones or alkyltetrahydroanthraquinones with hydrogen in the presence of a catalyst. It is known to carry out the hydrogenation stage in the presence of a suspension catalyst, in particular a suspension catalyst containing noble metals; as an alternative to this, it is also known to pass the working solution over a fixed bed catalyst arranged in a hydrogenation reactor. The working solution leaving the hydrogenation stage is then treated with an oxygen-containing gas, the alkylanthraquinones and alkyltetrahydroanthraquinones re-forming and hydrogen peroxide being formed at the same time. The oxidation is followed by an extraction step, wherein hydrogen peroxide is extracted with an aqueous solution, and this solution is then purified and concentrated. The working solution is recycled back to the hydrogenation stage. An overview of the anthraquinone process for the preparation of hydrogen peroxide is given in Ullmann's Encyclopedia of Ind. Chem., 5$^{th}$ ed., vol. A 13, p. 447–456.

In one embodiment of the hydrogenation stage, suspension catalysts, such as, for example, palladium black, are employed. Although a high conversion is achieved here and the regeneration of the catalyst is simple, this process requires a greater technical outlay in order to separate the catalyst from the working solution before the oxidation stage. It is also a disadvantage of this process that only some of the expensive catalyst is in the actual hydrogenation reactor, but a large proportion is in the circulation tank.

The problems described above can be avoided by carrying out the hydrogenation stage using fixed bed catalysts of different structures. In the FMC process according to page 453 of the Ullmann publication cited above, the hydrogenation reactor contains a catalyst fixed bed of a particulate catalyst. The working solution and hydrogen are introduced at the upper end of the catalyst bed, and the hydrogenated solution is drawn off at the lower end. The optimum cross-section loading of the fixed bed is said to be 12 to 120 m$^3$ working solution per m$^2$ per hour. It has been found that the high abrasion resistance of the catalyst required for economical operation and an adequate service life thereof are often not achieved, so that for this fixed bed hydrogenation also, the plant must be provided with a good filtration device in order to free the hydrogenated working solution from very finely abraded catalyst. A similar process, in which the working solution and hydrogen are mixed by means of a static mixer before being introduced at the top of the hydrogenation reactor, is the principle of U.S. Pat. No. 4,428,922. The service life is also reduced due to abrasion of the catalyst. The service life of the fixed bed catalyst has a great influence on the profitability of the process, so that there is great interest in increasing the service life of the catalyst.

Another process, the principle of which is using a fixed bed catalyst in the hydrogenation stage, is known from EP 0 672 617 A1. Here also the catalyst bed comprises particulate particles, and the working solution and hydrogen are passed as a foam-like mixture through the catalyst bed from the top downwards. It is essential to this process that the speed of the working solution at the inlet is very high, for example 2 to 10 m/s, expressed as the volume flow per cross-section area; in the catalyst bed, the volume flow with respect to the cross-section of the reactor can be low, for example 5 to 50 cm/s. The actual catalyst bed comprises static mixer elements which are filled with the particulate catalyst. It is regarded as a disadvantage in this process that due to the high flow rate (cross-section loading in the actual hydrogenation reactor), which is between about 470 and 650 m/h in the embodiment examples, a high pressure loss occurs and the energy expenditure therefore increases. Because of the high mechanical stress; increased abrasion of the catalyst furthermore easily occurs, and therefore there is a decrease in productivity. Finally, the reactor construction per se is quite involved technically.

Another embodiment of a catalyst fixed bed comprises a hydrogenation reactor with a honeycomb structure, the catalyst being on the walls of this structure—reference is made to U.S. Pat. No. 5,063,043, by way of example. This document also shows that the productivity decreases drastically when the reactor volume is increased from 50 liters to 1000 liters, if the working solution and hydrogen are passed through the monolithic reactor from the bottom upwards. However, if the working solution and hydrogen are passed through the channels of the monolith from the top downwards, the productivity decreases only slightly for a corresponding increase in the size of the plant. A disadvantage of the hydrogenation process using a vertical monolithic fixed bed reactor in carrying out the hydrogenation stage in the anthraquinone process is the problem of regeneration of the catalyst—in general the entire monolithic element must be destroyed and replaced by a new element coated with active catalyst.

SUMMARY OF THE INVENTION

The object of the present invention is accordingly to provide an improved process for carrying out the hydrogenation stage in the anthraquinone process for the preparation of hydrogen peroxide, wherein the hydrogenation is carried out in a hydrogenation reactor with a fixed bed catalyst and the disadvantages described above for the processes already known are avoided entirely or to a substantial degree. In particular, the hydrogenation reactor should have a simple construction. It should be possible to operate the process according to the invention such that the highest possible service life of the catalyst results, so that an improved profitability of the process is achieved compared with the closest prior art.

The objects described and others such as can be seen from the following description can be achieved by the process according to the invention. A process has been found for the preparation of hydrogen peroxide by the anthraquinone process, comprising a hydrogenation stage and an oxidation stage, wherein, in the hydrogenation stage, a working solution comprising an anthraquinone reaction carrier and a gas phase comprising hydrogen are passed over a fixed bed of particulate catalyst arranged in a hydrogenation reactor at a temperature of 10° to 100° C. under a pressure of 0.1 to 2 MPa, which is characterized in that the hydrogenation reactor is operated as a bubble column, in that a mixture of the working solution and the gas phase comprising hydrogen is passed through the hydrogenation reactor from the bottom upwards.

It has been found that, surprisingly, the service life of the catalyst can be increased noticeably if the mixture of working solution and hydrogen or gas comprising hydrogen is passed through the catalyst bed of particulate catalyst from the bottom upwards, contrary to the doctrine of the prior art. It has been found that in the mode of operation already known for the hydrogenation reactor, that is to say wherein the working solution and hydrogen flow through the catalyst bed from the top downwards, the activity decreases with an increasing duration of operation. In contrast, in the mode of operation according to the invention, from the bottom upwards—which is a bubble procedure—substantially no drop in activity occurs. The somewhat lower starting level of the activity in the procedure according to the invention is more than compensated by this being maintained during a long operating time. The process according to the invention thus leads to a higher profitability.

EP 0 999 181 A1 which has been published after the priority date of the present application is also directed to the hydrogenation stage of the anthraquinone process for producing hydrogen peroxide. A mixture of a working solution and a hydrogenation gas is directed through a fixed bed of the catalyst from the bottom upwards. The empty tube speed of the working solution is disclosed as being "in general 0.02 to 0.20 cm/s" (=0.72 to 7.2 m/h). As found and shown by Examples 4 to 6 of the present application, an increase of the empty tube speed of the working solution to values of 8 to 80 m/h, preferably 10 to 50 m/h, results in an unexpected increase of the space-time-yield.

The known reaction carriers and known solvents for the working solution can be employed in the process according to the invention.

The catalyst fixed bed of a particulate catalyst is expediently arranged in a vertically aligned columnar reactor in a manner known per se. The base of the catalyst bed can be supported on a mesh gauze or on a finely perforated or porous plate. The upper side of the particulate catalyst bed is also expediently designed such that the particulate catalyst is not discharged from the reactor with the flow. It has been found that a good distribution of the hydrogen over the entire column cross-section is achieved by metering the hydrogen directly into the working solution and introducing the mixture at the bottom of the hydrogenation reactor. The working solution and hydrogen therefore do not have to be premixed by means of special devices, such as static mixers.

The hydrogenation reactor can be filled with particulate catalysts known for the anthraquinone process. The catalysts are particularly preferably supported catalysts comprising noble metal, in particular comprising palladium. Suitable support materials are, in particular, charcoal, aluminium oxide and silica or siliceous materials. The catalyst particles can have various shapes, such as, in particular, spheres, granular granules and rods. The average diameter or the average largest extended length is in general in the range from 0.1 to 20 mm, preferably 0.5 to 20 mm, and in particular 1 to 10 mm.

In the mode of operation according to the invention of the hydrogenation reactor, the working solution is passed through the catalyst bed with an empty tube speed (i.e., cross-section loading) of 0.05 to 100 m/h, preferably 8 to 80 m/h and in particular 10 to 50 m/h. The liquid loading LHSV (liquid hourly space velocity) can be selected from a broad range, as shown by the Examples. By increasing the height of the reactor the LHSV-value can be decreased and this may have a positive impact on the turnover—by doubling the height of the reactor the LHSV-value can be halved.

The hydrogenation is carried out in a manner known per se at a temperature in the range from 10° to 100° C., in particular 40° to 60° C., under a pressure of less than 2.0 MPa, preferably 0.1 to 2 MPa, more preferably in 0.2 to 0.7 MPa. According to a preferred embodiment, the dimensions of the reactor and the hydrogenation conditions are such that the hydrogen fed to the reactor is used up completely on its route through the catalyst bed.

The process according to the invention is distinguished in that the catalyst service life is increased significantly compared with the mode of operation already known. Furthermore, no expensive construction is required for the hydrogenation reactor. The low flow rate in the catalyst bed moreover reduces the risk of abrasion and therefore reduces the decrease in productivity and service life of the catalyst. The embodiment according to the invention of the hydrogenation stage is not linked to a particular composition of the working solution and/or the hydrogenation temperature and the hydrogenation pressure.

DETAILED DESCRIPTION OF THE PREFERRED EMBODIMENTS

The invention is illustrated further with the aid of the following examples.

EXAMPLES E1 AND E2 AND COMPARATIVE EXAMPLES CE1 to CE3

The hydrogenation was carried out continuously in a reaction tube with a reactor volume of 5 ml. The height of the fixed bed catalyst was 25 mm. The plant comprised a liquid reservoir, the reactor and a liquid separator. The reaction temperature was established via a heat transfer oil circulation. The pressure and stream of hydrogen were regulated electronically. The working solution was metered into a stream of hydrogen with a pump, and the mixture was introduced into the bottom of the hydrogenation reactor in the procedure according to the invention (bubble column procedure) and at the top of the reactor in a conventional procedure (trickle bed procedure). After flowing through the reactor, the product was removed from the separator at regular intervals. The working solution based on substantially alkylaromatics and tetrabutylurea comprised as the reaction carrier 2-ethyltetrahydroanthraquinone in a concentration of 87.8 g/l and ethylanthraquinone in a concentration of 33 g/l. The reactor pressure was 0.5 MPa in all the examples and comparison examples. The liquid loading LHSV was 4 $h^{-1}$ in all cases and the reactor temperature was 61° C. The stream of hydrogen fed to the reactor was 10 Nl/h in all cases.

A supported catalyst, namely palladium on $Al_2O_3$ (SA 5151, Norton, Akron, Ohio) was employed as the catalyst; the average particle size of the granule-like supported catalyst was 1–2 mm.

An aqueous palladium nitrate solution was employed for charging the support. 100 g of the support material were initially introduced into a coating pan and a solution of 29 g water and 0.22 g palladium nitrate was poured over the material in the rotating pan. The coated support was dried in air for 16 h and then heated up to 200° C. in a tubular oven. The catalyst was subsequently reduced with hydrogen at 200° C. for 8 h and then washed three times with 40 ml distilled water each time.

The following Table 1 shows the results of Examples E1 and E2 according to the invention and of Comparative Examples CE 1 to CE 3.

TABLE 1

| No. | Flow direction | Operating time [h] | $H_2O_2$ equivalent [g/l] |
|---|---|---|---|
| CE 1 | Downwards | 16 | 7.3 |
| CE 2 | Downwards | 163 | 5.8 |
| CE 3 | Downwards | 281 | 4.8 |
| E 1 | Upwards | 22 | 6.4 |
| E 2 | Upwards | 214 | 6.4 |

The experiments show that in the embodiment according to the invention (E1 and E2) the $H_2O_2$ equivalent remains constant over the operating time selected. In the embodiment which is already known (CE1 to CE3), that is to say feed of the catalyst bed from the top in a trickle bed procedure, a somewhat higher $H_2O_2$ equivalent is achieved at the start, but this decreases drastically during the operating time.

EXAMPLES 3 TO 6 (E3–E6) AND COMPARATIVE EXAMPLE 4 (CE4)

The hydrogenation has been performed analogously to Example 1 (E1), but has used a higher catalyst bed; furthermore, the LHSV-values and therewith the empty tube speed of the working solution have been increased. The gas stream has been increased proportionally to the liquid stream. Table 2 shows essential operation data and the space-time-yield after 6 h operation.

TABLE 2

| Example No. | Reactor (fixed bed) volume ($cm^3$) | Reactor (fixed bed) height (cm) | LHSV ($h^{-1}$) | Empty tube speed (m/h) | $H_2O_2$-equivalent ($gH_2O_2/l$) | Space-time-yield ($gH_2O_2/h1$ reactor) |
|---|---|---|---|---|---|---|
| E3 | 20 | 10 | 10 | 1 | 6.6 | 66 |
| E4 | 80 | 40 | 25 | 10 | 6.8 | 170 |
| E5 | 200 | 100 | 40 | 40 | 7.1 | 284 |
| E6 | 200 | 100 | 80 | 80 | 3.1 | 248 |
| CE4 | 200 | 100 | 160 | 160 | 0.8 | 128 |

The Examples show that the highest space-time-yields are obtained operating the reactor with an empty tube speed of the working solution of 10 m/h and 40 m/h, respectively, Examples E4 and E5.

Operating the reactor with an empty tube speed of 80 m/h—see Example E6—leads to a slight reduction of the productivity and to some catalyst abrasion.

Due to an increased catalyst abrasion, an empty tube speed of 160 m/h, according to the non-inventive Comparative Example CE4, results in a shortened service time of the catalyst and to a reduction of the space-time-yield.

What is claimed is:

1. A process for the preparation of hydrogen peroxide by the anthraquinone process, comprising a hydrogenation stage and an oxidation stage, comprising, in the hydrogenation stage:

passing a working solution comprising an anthraquinone reaction carrier and a gas phase comprising hydrogen over a fixed bed of particulate catalyst arranged in a vertically aligned columnar hydrogenation reactor at a temperature of 10° to 100° C. and under a pressure of 0.1 to 2 MPa, wherein the hydrogenation reactor is operated as a bubble column, in that a mixture of the working solution and the gas phase comprising hydrogen is passed through from the bottom of the hydrogenation reactor upwards with an empty tube speed of the working solution in a range of 0.05 to 100 m/h.

2. A process according to claim 1, wherein the empty tube speed of the working solution is in a range of 8 to 80 m/h.

3. A process according to claim 1, wherein the empty tube speed of the working solution is in a range of 10 to 50 m/h.

4. A process according to claim 1, wherein the reactor is operated with a liquid loading LHSV (liquid hourly space velocity) of 1 $h^{-1}$ to 20 $h^{-1}$.

5. A process according to claim 1, wherein the hydrogenation conditions and the amount of hydrogen are established such that substantially no further hydrogen is present at the top of the reactor operated as a bubble column.

6. A process according to claim 1, wherein the fixed bed catalyst comprises particles with an average largest extended length of the catalyst particles in a range from 0.1 to 20 mm.

7. A process according to claim 6, wherein the average largest extended length of the catalyst particles is in a range from 0.5 to 20 mm.

8. A process according to claim 6, wherein the fixed bed catalyst is a supported catalyst comprising a noble metal.

9. A process according to claim 8, wherein the noble metal comprises Pd.

\* \* \* \* \*